United States Patent [19]

Wilson et al.

[11] 4,038,768
[45] Aug. 2, 1977

[54] VIEWER STORING MICROFICHE FILE BINDER

[75] Inventors: Robert B. Wilson, Holyoke; Raymond T. Cassidy, Ashfield, both of Mass.

[73] Assignee: National Blank Book Company, Inc., Holyoke, Mass.

[21] Appl. No.: 687,155

[22] Filed: May 17, 1976

[51] Int. Cl.² .................................................. G09F 1/04
[52] U.S. Cl. ........................................ 40/106.1; 40/102
[58] Field of Search ..................... 40/102, 106.1, 63 A

[56] References Cited

U.S. PATENT DOCUMENTS

| 2,298,754 | 10/1942 | Davis | 40/106.1 |
|---|---|---|---|
| 2,779,116 | 1/1957 | Smith | 40/106.1 |
| 2,962,825 | 12/1960 | Bravo et al. | 40/106.1 |
| 3,488,872 | 1/1970 | Levy | 40/63 A |
| 3,562,939 | 2/1971 | Jacobs et al. | 40/63 A |

Primary Examiner—Russell R. Kinsey
Assistant Examiner—Wenceslao J. Contreras
Attorney, Agent, or Firm—Chapin, Neal and Dempsey

[57] ABSTRACT

A binder for filing microfiche cards together with a portable card viewer, said binder having a pair of hinged cover panels connected by a U-shaped assembly and a looseleaf binding mechanism mounted between the sides of said assembly above the back panel thereof thereby forming a compartment between said binding mechanism and said back panel. Said back panel being provided with an opening for receiving the barrel of the card viewer when said viewer is held against said back panel of said assembly by a releasable retainer flap.

3 Claims, 5 Drawing Figures

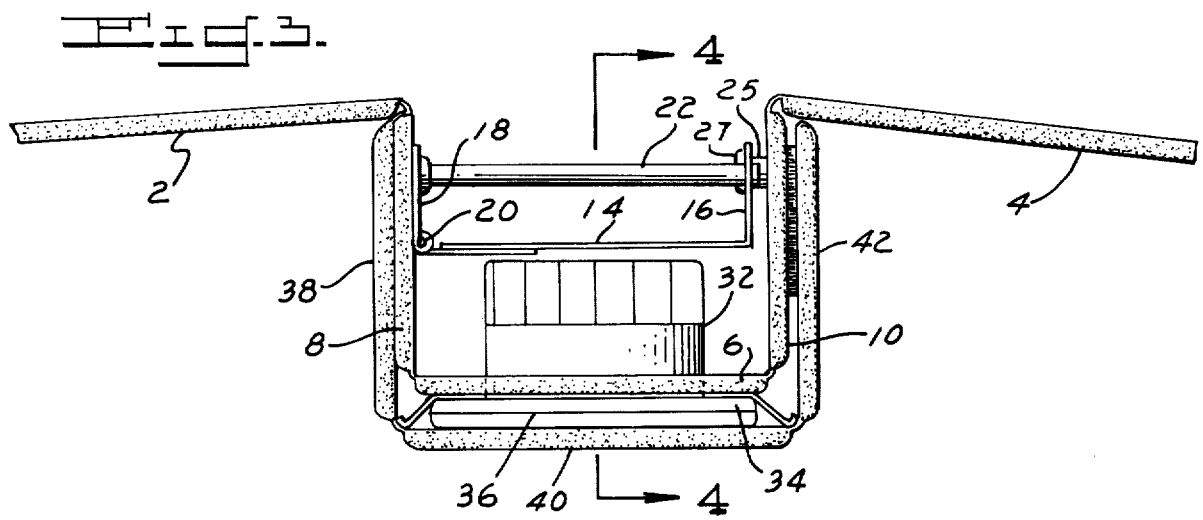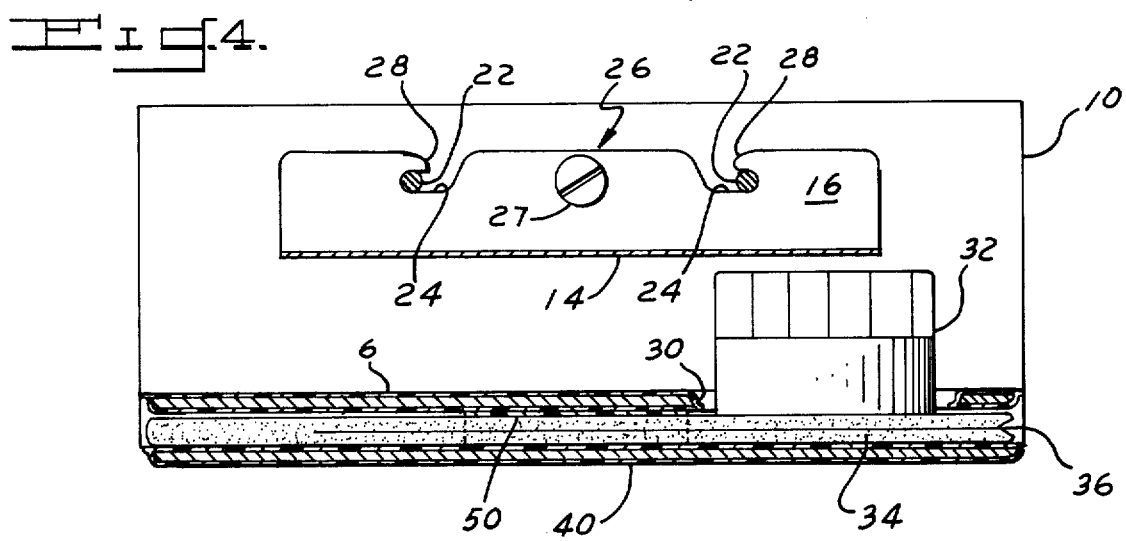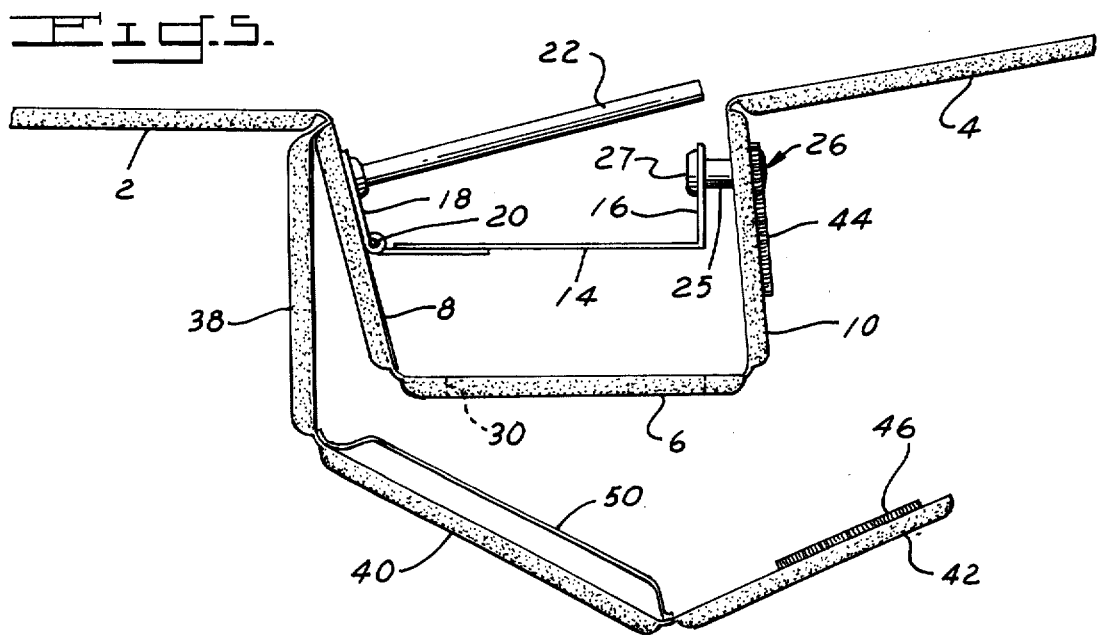

4,038,768

VIEWER STORING MICROFICHE FILE BINDER

BACKGROUND

The present invention relates to looseleaf type binders. In particular, it relates to looseleaf binders for filing and storage of microfiche cards and the like, together with a portable microfiche card viewer.

In the use of microfiche cards, it is desirable to have available a portable card viewer for viewing the cards at their point of storage. In this case, cards may be immediately reviewed as to pertinency prior to their being transferred to a large stationary microfiche card viewer for study.

Accordingly, it is an object of the present invention to provide a binder for filing and storage of microfiche cards, together with a portable card viewer.

It is another object of the present invention to provide a looseleaf type binder having means for storing a microfiche card viewer therein.

It is another object of the present invention to provide a binder having a hinged retainer flap for releasably securing a microfiche card viewer to said binder.

It is a further object of the present invention to provide a portable viewer storing microfiche card binder that is compact in design so that it may be easily carried and stored.

The above and other objects and advantages of the present invention will become readily apparent when considered in view of the following description and the accompanying drawings, in which:

FIG. 3 is an end edge view of the back panel structure of the binder assembly of FIG. 1;

FIG. 4 is a section on line 4—4 of FIG. 3; and

FIG. 5 is a view similar to FIG. 3 showing the retainer flap and binder posts in a partially opened position and the viewer removed.

In the assembly disclosed herein binder covers 2 and 4 are hinged at opposite sides of a U-shaped back panel structure which includes a back panel 6 and side panels 8 and 10 hinged to back panel 6 and to the covers 2 and 4, respectively. In closed condition of the assembly, panels 8 and 10 lie in an opposed generally parallel relation.

The panels as shown by the drawings may be of any suitable construction. They are here indicated (see particularly FIG. 4) as made up with cardboard stiffeners or liners enclosed between covering sheets of thermoplastic material welded around the edges of the stiffeners. Between adjacent edges of the stiffeners, the plastic sheets are welded or bonded together to provide hinges for the various panels of the binder.

Figure 1:
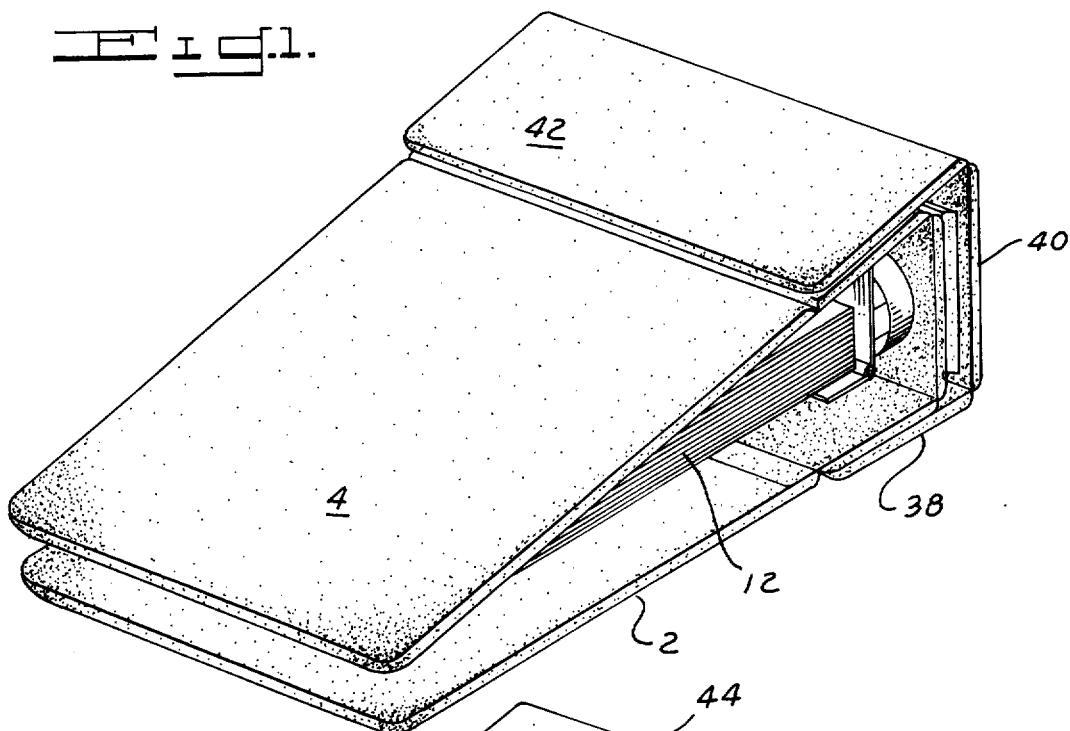
FIG. 1 is a perspective view of a binder assembly embodying the invention.
Figure 2:
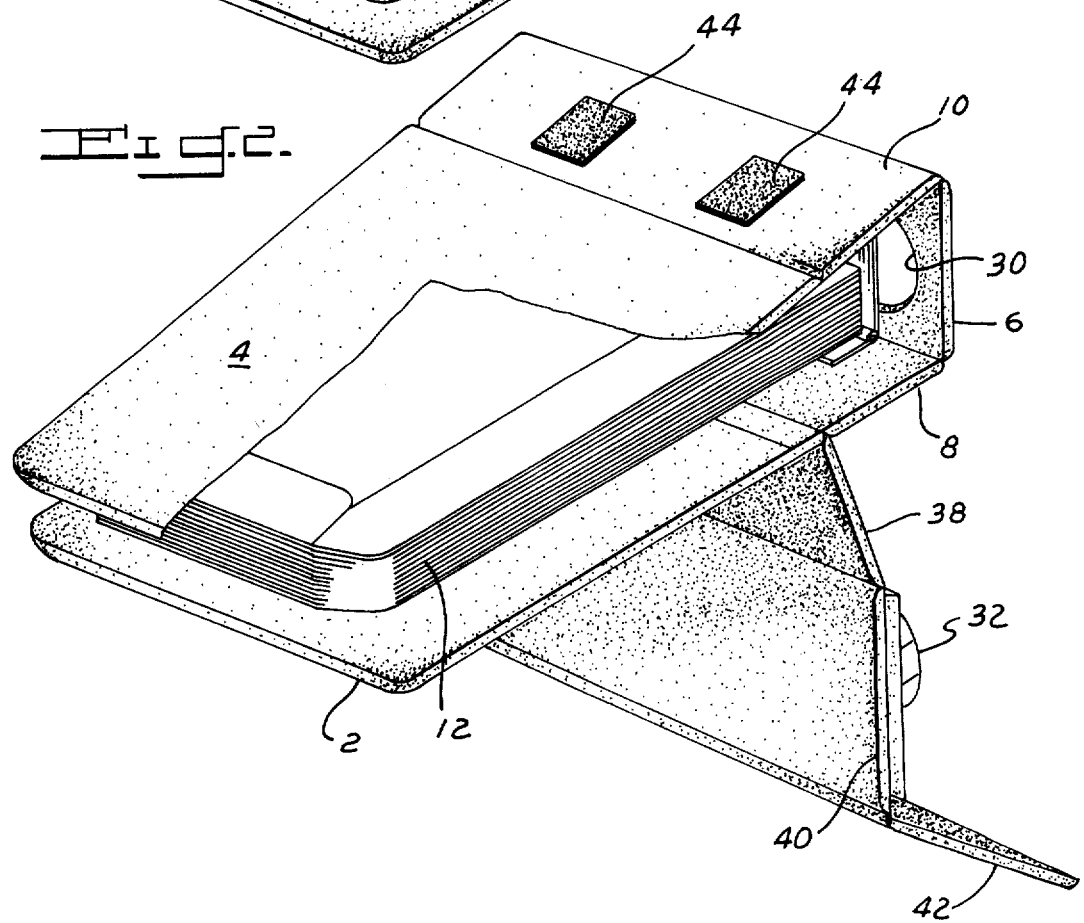
FIG. 2 is a view similar to FIG. 1 with the flap for retaining a microfiche card viewer swung into "open" position.

As best seen by FIG. 3, panels 6, 8, and 10 are releasably maintained in a right-angled U-shaped form by the mounting (between panels 8 and 10 spaced forwardly of panel 6) of a looseleaf mechanism, such as the post binder device shown. On the posts a plurality of card holding envelopes 12 are carried as seen in FIGS. 1 and 2. The looseleaf device may be of any suitable type. In the device illustrated a back connector plate 14 has an integrally bent right-angled post-latching plate 16 along one edge (FIGS. 3, 4); and along the other edge a pivotable post mounting plate 18 is carried as by the piano hinge connection at 20.

The binding device is preferably of spring-metal and posts 22 which are generally parallel to one another are rigidly fixed to plate 18, the latter being secured flatly against the surface of panel 8 as by suitable riveting. In the closed position (FIGS. 3 and 4) the free ends of posts 22 engage latch plate 16 and hold the parallel relationship of plates 18 and 16 (FIG. 3). Plate 16 is suitably notched as by the bayonet-type slots at 24 (FIG. 4) and the posts 22 which are rigid are engageable at their free ends with the slots 24. As will be apparent, the posts may be disengaged by manipulating the ends toward each other and springing the posts upwardly and out of the notches to swing the posts and plate 18 on the pivot 20, as seen in FIG. 5.

It will also be noted that plate 16 is mounted on panel 10 by a central stud-like fastener button 26 and held thereby in a slightly spaced relation to the surface of the panel 10. Fastener 26 comprises a short tubular headed stem 25 projecting through the panel 10. Plate 16 is held against the inner end of sleeve 25 by a headed screw bolt portion 27 of the fastener passing through an opening in the plate and being threaded into the sleeve against the plate. Plate 18 is permitted pivotal movement with panel 8 as a unit to swing posts 22 away from plate 16 (FIG. 5) to add or subtract envelopes 12 and allow some relative movement between plate 16 and panel 10. This type of mounting also provides ample clearance for the free ends of the posts to extend beyond the back of the plate and assure secure positional latching action by the notches.

It will also be appreciated from FIG. 4 that the contoured nose 28 at the entrance edge of each notch 24 serves to cam the free ends of posts 22 and cause them to snap into place merely by pushing the post ends downwardly against the edge of the plate 16.

Referring now to the provision for securing a card viewer in the unit, back panel 6 is provided with an opening adjacent one end, such as the circular aperture at 30. This opening is adapted to receive the lens barrel portion 32 projecting from a handle portion 34 of a card viewer. As will be apparent to those familar with such devices, handle 34 is a flat blade-like member provided with a slit at 36 to receive a microfiche card for viewing the same through the eye piece.

As best seen by FIGS. 3 and 4, the lens barrel 32 projects through opening 30 into the compartment provided between panel 6 and plate 14 where it is protected fron external shock. Such adaptation permits the handle 34 to be held in coplanar and abutting relation with the outer surface of rear panel 6 by a retaining flap member formed as shown by panels preferably of the same construction as the panels previously described. The flap has an inner panel section 38 which has an edge thereof pivotally mounted along the hinge portion between cover 2 and panel 8. Panel section 38 is rectangular and designed to overlie panel 8. Hingedly connected to inner section 38 is an intermediate section 40 designed to overlie back panel 6 with the handle of the card viewer therebetween.

A third rectangular section 42 is similarly connected to section 40. The outer section 42 is designed to overlie panel 10 and to be releasably fastened to it with the card viewer in the storage position shown. Any suitable means for the releasable fastening of the flap may be used. In the preferred embodiment shown pairs of mating Velcro patches are provided on the outer surface of panel 10 at 44 and the inner face of flap panel section 42 as at 46 (see FIG. 5).

It may be noted that a sleeve-like band 50 is also provided on the inner face of intermediate section 40 which functions as a holding strap for securing the handle 34. Alternatively, the strap may be omitted and the opening 30 dimensioned to provide a friction fit of lens barrel 32. In this event, swinging the retainer flap from assembled position leaves the viewer in place for manual removal from the opening 30 rather than slipping it out of the keeper strap in the form shown.

This invention provides in one convenient package a combination binder and viewer of the same general configuration and approximate size as a binder per se. While the viewer is housed within a case and protective storage unit which is part of the binder, the binder nevertheless retains its normal flat binder panel whereby the unit may be conveniently and comfortably handled and carried much as an ordinary looseleaf binder. There is, moreover, the added advantage that the microfiche cards and viewer therefore are invariably together and ready for immediate and convenient conjunctive use.

That which is claimed is:

1. Binder device for filing and storing microfiche cards and the like together with a portable viewer of the type having a flat card holding handle and a magnifying lens barrel projecting outwardly from said handle, said device comprising a pair of cover panels, a generally U-shaped assembly including a back panel and spaced opposed side panels from which said covers hingedly extend, a looseleaf binder mechanism extending between said side panels above said back panel and spaced therefrom a distance not less than the length of said barrel, an aperture extending through said back panel to receive said barrel therethrough, and retaining means releasably interconnectible with said binder to cover over at least a portion of said back panel for holding said viewer against said back panel when the lens of the viewer is disposed in said aperture, said aperture being located adjacent one end of said back panel so that the handle of the viewer will be generally coextensive with the back panel when the barrel of the viewer is in said aperture.

2. Binder device for filing and storing microfiche cards as set forth in claim 1 in which said retaining means comprises a swingable flap hingedly connected to said binder at one end and extending generally from end-to-end of the binder and having fastening means at its other end.

3. Binder device for filing and storing microfiche cards as set forth in claim 2 wherein said flap is releasably connected to said U-shaped assembly by mating hook and loop type fastener strips, one disposed on said binder and the other on the inner surface of said flap, said binder further including a flexible strap disposed within said flap for holding said viewer in its stored position against the back panel of said binder.

* * * * *